J. SIDDELEY & F. N. MACKAY.
Cells for the Tanks of Ice-Machines.
No. 206,627. Patented July 30, 1878.
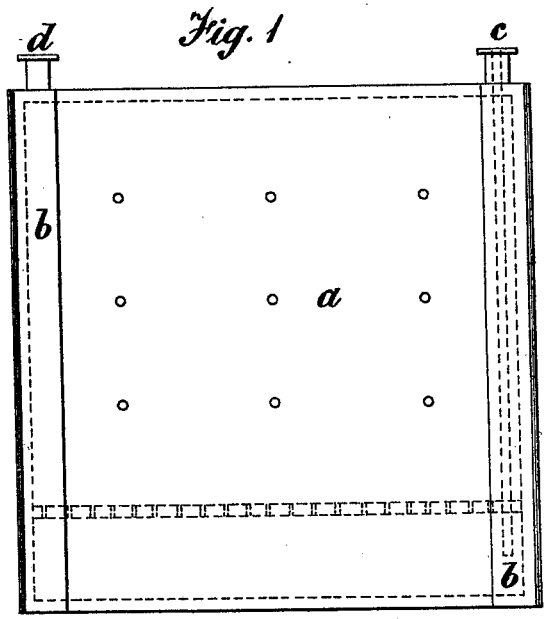
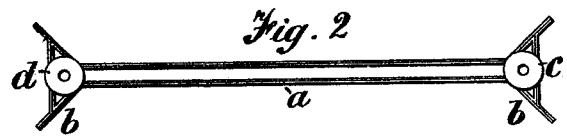

UNITED STATES PATENT OFFICE

JOSHUA SIDDELEY AND FREDERICK N. MACKAY, OF LIVERPOOL, ENGLAND.

IMPROVEMENT IN CELLS FOR THE TANKS OF ICE-MACHINES.

Specification forming part of Letters Patent No. 206,627, dated July 30, 1878; application filed May 20, 1878; patented in England, May 10, 1875.

To all whom it may concern:

Be it known that we, JOSHUA SIDDELEY and FREDERICK NOEL MACKAY, both of Liverpool, in the county of Lancaster, England, have invented a new and useful Improvement in Cells to be used in the Tanks of Ice-Making Machines, for which English Patent No. 1,926 of 1875 was granted to us, of which the following is a specification:

This invention relates to cells through which brine or other fluid at a temperature below freezing-point is caused to circulate, and which are placed in a tank containing water to be frozen.

Hitherto cells for the above purpose have been made with parallel sides, and have, in some cases, had pieces attached to their ends to prevent the water from freezing to the sides of the tanks containing such cells. When, however, it has been desired to remove the blocks of ice formed from off the cells, the ice could not be thawed off from the ends of the cells, and great difficulty has been experienced in removing such blocks. In other cases, though the end pieces were formed hollow, they did not communicate with the body of the cell, and an independent circulation therethrough had to be established when it was desired to remove the blocks.

Now, the object of our invention is to so construct cells that the above-mentioned difficulties shall be obviated. For this purpose we make the end pieces of the cells hollow, and so attach or secure them to or form them with the cells that the brine which circulates through the cells shall also circulate through the end pieces. Therefore, when a warm fluid is passed through the cells, it also passes through the end pieces, and thaws the ice both from off the body of the cells and from off the end pieces.

Figure 1 is an elevation, and Fig. 2 plan view, of a wrought-iron cell constructed under our invention. $a$ is the body of the cell; $b$, hollow end pieces; $c$, entrance, and $d$ exit pipe, for brine or refrigerating fluid.

Fig. 3 is a plan view of a cast-iron cell. Here the hollow end pieces $b$ are shown cast separate from the body $a$ of the cell, the pieces being held together by longitudinal bolts $e$.

It will be obvious that wrought-iron cells and hollow end pieces may be brazed, riveted, bolted, welded, or otherwise connected together; and that cast-iron cells and end pieces may be cast in one piece, if desired. It will further be obvious that the end pieces may be carried along the bottom of the cells, if desired.

We do not herein claim cells for the tanks of ice-making machines having hollow end pieces, when the cavities of the end pieces do not communicate with the body of the cell; but

What we claim is—

Cells for the tanks of ice-making machines with hollow end pieces continuous with the cavity of the cell, through which and the body of the cells the same fluid may circulate.

JOSHUA SIDDELEY.
FREDK. N. MACKAY.

Witnesses:
D. KING,
J. JOHNSON.